E. W. ALLEIGH.

Assignor, by mesne-assignments, to THE NATIONAL EMBOSSING MACHINE COMPANY.

MACHINE FOR ORNAMENTING WOOD AND OTHER COMPRESSIBLE MATERIAL.

No. 11,121. Reissued Nov. 18, 1890.

WITNESSES:

E. K. Bolton

C. L. Davis

INVENTOR:

Edward W. Alleigh

By Marble, Mason & Canfield his Attorneys.

THE NORRIS PETERS CO., PHOTO-LITHO., WASHINGTON, D. C.

UNITED STATES PATENT OFFICE.

EDWARD W. ALLEIGH, OF CHICAGO, ILLINOIS, ASSIGNOR, BY MESNE ASSIGNMENTS, TO THE NATIONAL EMBOSSING MACHINE COMPANY, OF NEW JERSEY.

MACHINE FOR ORNAMENTING WOOD AND OTHER COMPRESSIBLE MATERIAL.

SPECIFICATION forming part of Reissued Letters Patent No. 11,121, dated November 18, 1890.
Original No. 400,423, dated April 2, 1889. Application for reissue filed April 28, 1890. Serial No. 349,836.

*To all whom it may concern:*

Be it known that I, EDWARD W. ALLEIGH, a citizen of the United States, and a resident of Chicago, Cook county, Illinois, formerly of Minneapolis, in the county of Hennepin and State of Minnesota, have invented new and useful Improvements in Machines for Ornamenting Wood and other Compressible Material, of which the following is a specification, reference being had to the annexed drawings, making part hereof, in which—

Figure 1:
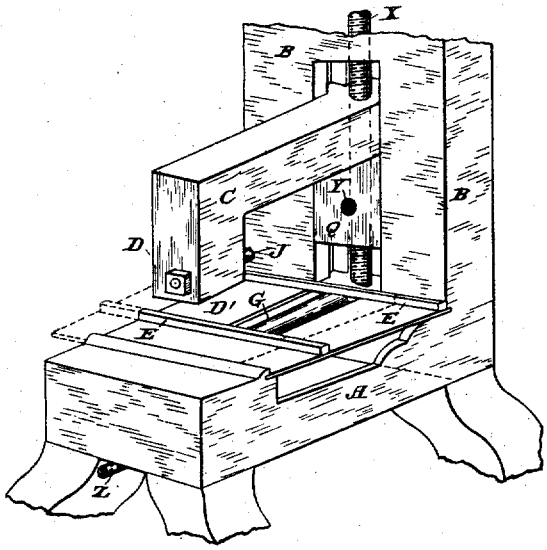
Figure 2:
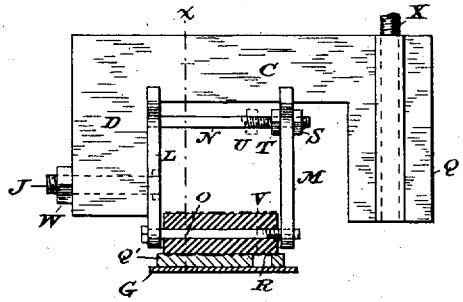
Figure 3:
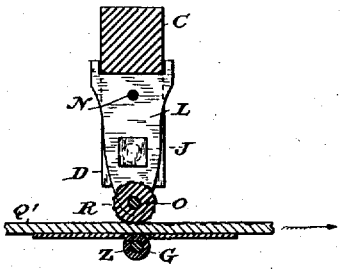

Figure 1 is a representation of a portion of the machine to which my invention is attached. Fig. 2 is an elevation of the supporting-arm removed from the other portion of the machine and with my invention attached and in position as when in use. Fig. 3 is a cross-section of Fig. 2 on line *x*.

This invention relates to novel devices for attaching small roller-dies to machines for imprinting wood and other compressible material in imitation of hand-carving, but more particularly for attaching such novel devices to a machine invented by me and for which an application for a patent was filed on August 7, 1888, Serial No. 282,145. In this machine the arm which supports the rotating die may have a certain reciprocating movement vertically of sufficient scope to permit of the use of the larger class of dies and permit ordinary thicknesses of material to be imprinted by them; but it is found impracticable to employ on this one machine, or any of the machines as now constructed, both large and small dies without an intervening mechanism which will bring the small dies down to or nearly to the material to be imprinted, a further adjustment being made by properly-constructed adjusting devices.

A represents the main bed portion of the frame, and B B are the strong standard portions of my said machine for imprinting wood with the larger class of dies.

C D is the arm which supports one end of the die-shaft, the other end of said die-shaft being supported in the carrying portion Q of the arm. This carrying portion has a vertical reciprocating movement in the standard portions B B, by means of a screw X, that the die may be adjusted to different thicknesses of material. At Fig. 1 the larger die would have a bearing on shaft J, providing it extended into the supporting portion Q at Y, and the material to be imprinted would be placed on a table D′, provided with guide straps or slats E, and carried forward by a feeding-roller G. In order to adapt this machine, as at Fig. 1, to do all kinds of ordinary imprinting, I employ two standards M and L, which are notched out at their ends to engage the under side of the supporting-arm C, and the arm L is rigidly secured to the depending portion D, as shown in Fig. 2, by means of a strong bolt J and nut W, said bolt being either cast solid to the arm L or made rigid to it. A screw-bolt N is also made practically rigid to the standard L, and it is long enough to pass through the parallel standard M, leaving sufficient space between the standards to accommodate the longest die to be employed, and the screw is formed far enough in on the bolt to permit a jam-nut T to be turned so far toward the standard L as will bring the two standards to the ends of the shortest die employed. A shaft O is practically made rigid to the standard L, and is made long enough to support the longest die employed and pass through and have a support in the arm M. A long die R is represented on shaft O, and the dotted lines U represent the jam-nut T, turned in for the use of a die, so long as the distance of the dotted line V is from standard L. When the jam-nut T is properly adjusted on the rod N, and the die is on shaft O, the nut S is to be turned closely against the standard M, and the die R will be held in position to imprint a piece of wood. (Shown at Q′.) When the larger class of dies are to be employed with the machine, remove the standards L M by disengaging the bolt J from the arm C D.

It is evident that many changes may be made in the means for attaching the standards L and M to the supporting-arm and increasing and diminishing the space between said standards in order to admit of the use of dies of different lengths without departing from the scope of my invention.

Having thus described my invention, its construction and operation, I claim and desire to secure by Letters Patent the following:

1. In a machine for ornamenting wood, the combination of the supporting-arm connected at one end with supporting-standards and adjustable thereon, and the die-supporting standards connected therewith and depending therefrom, substantially as shown and described.

2. In a machine for ornamenting wood, the combination, with the bed-plate, of the vertical standards connected therewith at one end thereof, the die-supporting arm connected at one end with the standards and adjustable thereon, the die-supporting standards connected with said arm and depending therefrom, a die-shaft, and means for adjusting one of said standards laterally, substantially as shown and described.

3. The combination, in a wood-ornamenting machine, of the table provided at one end with vertical standards, as B, a supporting-arm connected to said standards and adjustable thereon, a die mounted on a shaft provided with supports at each end connected with the supporting-arm, one of said supports being laterally adjustable, whereby dies of different lengths may be employed, substantially as shown and described.

4. The combination, in a wood-ornamenting machine, of a table provided at one end with vertical standards, as B, a supporting-arm connected with said standards and adjustable thereon, a die mounted on a shaft provided with supports at each end, one of said supports being laterally adjustable, whereby dies of different lengths may be employed, substantially as shown and described.

5. The combination, in a wood-ornamenting machine, of a table and standards, as B, at one end thereof and connected therewith, a die-supporting arm vertically adjustable on said standards, a feed-roll mounted in the top of the table, and a die mounted on a shaft supported by standards connected with and depending from the die-supporting arm, one of said standards being laterally adjustable, substantially as shown and described.

6. In a machine for imprinting wood, the standards L and M, notched at their top portions, in combination with the arm C D, which they engage, the arm L, carrying the fixed screw-rod N, the fixed bolt J, fixed shaft O, and the arm N, provided with bearings to receive the screw-rod N and shaft O, the screw-rod carrying the jam-nut T and a clamp-nut S, with the die R, table D′, and feed-roller G of the machine, as specified.

EDWARD W. ALLEIGH.

Witnesses:
CLARENCE L. DAVIS,
BENJ. HASKELL.